(12) United States Patent
Lindoff et al.

(10) Patent No.: US 8,861,572 B2
(45) Date of Patent: Oct. 14, 2014

(54) METHOD AND ARRANGEMENT OF DELAY SPREAD COMPENSATION

(75) Inventors: Bengt Lindoff, Bjärred (SE); Fredrik Nordström, Lund (SE); Bo Lincoln, Lund (SE); Anders Rosenqvist, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 489 days.

(21) Appl. No.: 13/145,789

(22) PCT Filed: Jan. 20, 2010

(86) PCT No.: PCT/EP2010/050629
§ 371 (c)(1),
(2), (4) Date: Sep. 30, 2011

(87) PCT Pub. No.: WO2010/084127
PCT Pub. Date: Jul. 29, 2010

(65) Prior Publication Data
US 2012/0027048 A1 Feb. 2, 2012

Related U.S. Application Data

(60) Provisional application No. 61/150,048, filed on Feb. 5, 2009.

(30) Foreign Application Priority Data

Jan. 23, 2009 (EP) .................................. 09151168

(51) Int. Cl.
*H04B 1/00* (2006.01)
*H04L 25/03* (2006.01)
*H04L 25/02* (2006.01)

(52) U.S. Cl.
CPC ....... *H04L 25/03006* (2013.01); *H04L 25/0216* (2013.01); *H04L 2025/03426* (2013.01)
USPC ............................ 375/148; 375/130; 375/147

(58) Field of Classification Search
USPC .......................................................... 375/148
See application file for complete search history.

(56) References Cited

U.S. PATENT DOCUMENTS 6,870,882 B1   3/2005   Al-Dhahir et al.
6,980,600 B1   12/2005  Ratnarajah
(Continued)

FOREIGN PATENT DOCUMENTS

JP    2001203666 A    7/2001
JP    2003124857 A    4/2003
(Continued)

OTHER PUBLICATIONS
PCT International Search Report, mailed Apr. 19, 2010, in connection with International Application No. PCT/EP2010/050629.
(Continued)

*Primary Examiner* — Shuwang Liu
*Assistant Examiner* — Gina McKie
(74) *Attorney, Agent, or Firm* — Leffler Intellectual Property Law, PLLC

(57) ABSTRACT

A method of delay spread compensation, suitable for use in a communication device a having plurality of receiver antennas, is disclosed. The method comprises receiving a plurality of signals, each via a respective antenna, wherein each signal comprises a signal component corresponding to a transmitted signal, and wherein each received signal experiences a respective channel impulse response having a corresponding delay spread; determining estimates of each of the channel impulse responses; calculating post-coding characteristics based on the estimates of the channel impulse responses; and post-coding the plurality of received signals using the post-coding characteristics to produce at least a first delay spread compensated signal. Corresponding computer program product, processing arrangement and communication device are also disclosed.

22 Claims, 5 Drawing Sheets

(56) References Cited

U.S. PATENT DOCUMENTS

| | | | |
|---|---|---|---|
| 2005/0249180 A1* | 11/2005 | Murakami et al. | 370/343 |
| 2006/0109897 A1 | 5/2006 | Guo et al. | |
| 2006/0159160 A1 | 7/2006 | Kim | |
| 2007/0297494 A1* | 12/2007 | Lindoff | 375/148 |
| 2013/0022090 A1* | 1/2013 | Weng et al. | 375/219 |

FOREIGN PATENT DOCUMENTS

| | | | |
|---|---|---|---|
| JP | 2006050253 A | 2/2006 | |
| JP | 2007300606 A | 11/2007 | |
| JP | 2008160386 A | 7/2008 | |
| JP | 2010045679 A | 2/2010 | |
| WO | 2007001867 A2 | 1/2007 | |
| WO | 2007/147506 A1 | 12/2007 | |
| WO | 2007147506 A1 | 12/2007 | |
| WO | 2008/026835 A1 | 3/2008 | |
| WO | 2008/051128 A1 | 5/2008 | |
| WO | 2009/056500 A2 | 5/2009 | |

OTHER PUBLICATIONS

PCT Written Opinion, mailed Apr. 19, 2010, in connection with International Application No. PCT/EP2010/050629.

International Preliminary Report on Patentability, mailed Apr. 21, 2011, in connection with International Application No. PCT/EP2010/050629.

Japanese Office Action, mailed Oct. 7, 2013, in connection with counterpart Japanese Patent Application No. 2011-546781, all pages (see translation below).

Translation of Japanese Office Action, mailed Oct. 7, 2013, in connection with counterpart Japanese Patent Application No. 2011-546781, all pages.

Masakazu, Utsunomoya et al. "An iterative signal detection scheme for MIMO SC-FDE using ISI canceller and MLD", The Institute of Electronics, Information and Communication Engineers, Feb. 21, 2008, vol. 107, No. 498, pp. 89-94, WBS2007-77.

\* cited by examiner

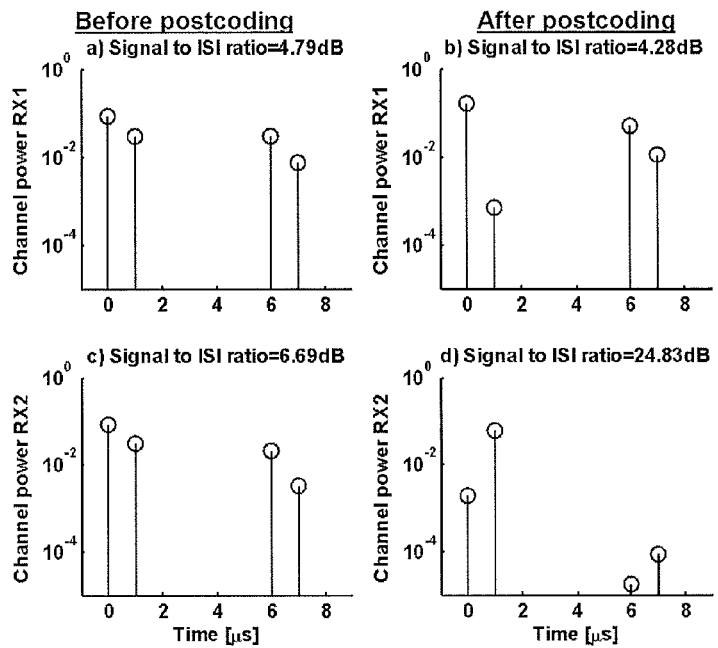
Fig. 6
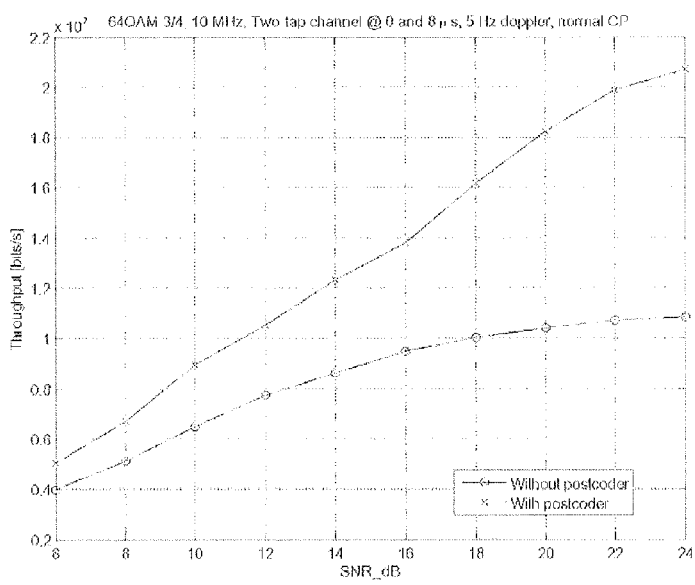 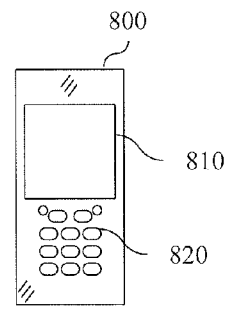
Fig. 7                                   Fig. 8

METHOD AND ARRANGEMENT OF DELAY SPREAD COMPENSATION

CROSS REFERENCE TO RELATED APPLICATIONS

This application claims priority under 35 U.S.C. §119 to European Patent Application No. EP 09151168.3, filed on Jan. 23, 2009, which is hereby incorporated herein by reference in its entirety. This application also claims the benefit of U.S. Provisional Application No. 61/150,048, filed Feb. 5, 2009, which is hereby incorporated herein by reference in its entirety.

TECHNICAL FIELD

The present invention relates generally to the field of delay spread compensation. More particularly, it relates to compensation of delay spread in a received signal by using post-coding.

BACKGROUND

Orthogonal Frequency Division Multiplexing (OFDM) is a radio access technology, which has been selected for a number of wireless communications systems, such as, for example, 3GPP LTE (3rd Generation Partnership Project—Long Term Evolution), WiFi (Wireless Fidelity) and WiMax (Worldwide Interoperability for Microwave Access). In OFDM, a number of narrow-band symbols are transmitted in parallel (each symbol on a respective sub-carrier) in a frequency domain. The transmitter and receiver in an OFDM system efficiently convert the symbols in the frequency domain to and from the corresponding time-domain waveform using IFFT (Inverse fast Fourier transform) and FFT (fast Fourier transform) operations respectively. A collection of narrow-band symbols, together forming an output of an IFFT and/or an input to a FFT, is henceforth denoted an OFDM symbol. An OFDM symbol may appear both as a time-domain OFDM symbol and as a frequency-domain OFDM symbol.

Since each individual sub-carrier is narrow-banded in OFDM, the narrow-band symbols are relatively robust against frequency-selective fading, i.e. dispersion in the propagation channel due to multiple signal paths. For moderate channel dispersion the channel remains approximately flat over the narrow frequency band corresponding to each narrow-band symbol in isolation, even if fading dips are experienced over the overall signal frequency band of a frequency-domain OFDM symbol. That the channel remains approximately flat over the narrow frequency band corresponding to each narrow-band symbol effectively limits the inter-channel interference (ICI).

In order to improve robustness against channel dispersion further, a cyclic prefix (CP) is often used in OFDM systems. The CP is introduced in a time-domain OFDM symbol by pre-pending a copy of the last part of the time-domain OFDM symbol prior to transmission. The application of a CP eliminates the inter-symbol interference (ISI), i.e. the interference between OFDM symbols, altogether provided the channel dispersion (i.e. the delay spread) is less than the length of the CP.

However, when OFDM transmission is attempted over heavily dispersive channels, the resulting ISI may not be negligible despite the degree of robustness built into the OFDM scheme and even if a CP is used. This is because the ISI is not entirely eliminated if the channel dispersion is greater than the length of the CP.

In a practical OFDM system, the length of the CP is a compromise. A long CP is beneficial because it provides ISI-counteraction in scenarios with long delay spreads. However, a long CP is a waste of transmission recourses in typical scenarios (i.e. with moderate delay spread not requiring an overly long CP to accommodate the ISI) due to the copying of part of the OFDM symbol. This is to say that when the CP is not really needed, the transmission energy used for the CP does not directly improve the available data rates or coverage. On the other hand, while not wasting a lot of transmission resources, a short CP only provides ISI-accommodation in scenarios with a small delay spread. The CP is usually pre-defined in an OFDM system and is therefore typically designed for a typical delay spread case.

In many communication systems several cell sites cooperate in transmitting the same signal. In such systems, effective multipath channels with very large delay spreads may be experienced at a receiver. This may be the case even if each individual channel from a single cell site is quite compact. Examples of systems where several cell sites cooperate in this way are broadcast systems having SFN—(Single Frequency Network) or CoMP—(Coordinated MultiPoint transmission) type deployments.

Thus, there are practical propagation scenarios for OFDM systems where the delay spread may exceed the CP and introduce ISI. For transmission at high coding rates, even moderate ISI will be detrimental to the signal reception and limit the data rates experienced by a user. As touched upon above, one way to accommodate this problem would be to make the CP longer. But if not all users are likely to experience such large delay spreads, adjusting the CP would be a waste of system capacity. In the systems where several cell sites cooperate in transmitting the same signal, the delay spread experienced by a user depends on the user's location in relation to the cell sites. Therefore, an adjustment of the CP length may be mostly a waste of system capacity.

Therefore, there is a need for methods and arrangements that improve the quality of reception in heavy multipath (e.g. a delay spread longer than the CP) without relying on an extended CP.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements of delay spread compensation of a received signal.

According to a first aspect of the invention this is achieved by a method of delay spread compensation, suitable for use in a communication device a having plurality of receiver antennas. The method comprises receiving a plurality of signals, each via a respective antenna, wherein each signal comprises a signal component corresponding to a transmitted signal, and wherein each received signal experiences a respective channel impulse response having a corresponding delay spread; determining estimates of each of the channel impulse responses; calculating post-coding characteristics based on the estimates of the channel impulse responses; and post-coding the plurality of received signals using the post-coding characteristics to produce at least a first delay spread compensated signal.

The term delay spread compensation is to be interpreted as operations that take account of the delay spread. Such operations may aim to reduce or completely remove the delay spread of a signal before submitting the signal to certain processing operations in a receiver. Thus, the term delay spread compensation may comprise delay spread reduction and/or delay spread removal. Delay spread reduction is understood to mean both the situation when the time difference between the first and last component of the delay profile is reduced and the situation when the time difference between the first and last component of the delay profile is not reduced but the energy distribution of the delay profile is more concentrated. The term delay spread compensation is also meant to comprise cases where delay spread is not reduced in all of the receiver branches but is unchanged or increased in one or more receiver branch.

In some embodiments, the method may further comprise determining whether at least one of the delay spreads corresponding to respective channel impulse responses is larger than a delay spread threshold. In such embodiments, the steps of: calculating post-coding characteristics based on the estimates of the channel impulse responses; and post-coding the plurality of received signals using the post-coding characteristics to produce at least a first delay spread compensated signal may be performed only if it is determined that at least one of the delay spreads is larger than the delay spread threshold. It is to be understood that the delay spread is larger than the delay spread threshold if the delay spread has an extension in time that is longer than a value associated with the delay spread threshold, e.g. the threshold value itself or the threshold value plus a bias term.

In some embodiments, the condition that at least one of the delay spreads is larger than the delay spread threshold may comprise the further condition that all (or a certain number greater than one) of the delay spreads should be larger than the delay spread threshold for the post-coding to be applied.

In some embodiments, the at least first delay spread compensated signal may comprise a plurality of delay spread compensated signals. The plurality of delay spread compensated signals may be a same plurality as the plurality of received signals.

In some embodiments, the post-coding characteristics may comprise a post-coding matrix. In such embodiments, the post-coding matrix may be calculated based on value and timing of components of the channel impulse response estimates.

The step of calculating the post-coding matrix may, in some embodiments, comprise performing singular value decomposition on a matrix comprising the components of the channel impulse response estimates.

In some embodiments, the components of the channel impulse response estimates may be arranged into at least two subsets of components and the post-coding matrix may be calculated based on the subsets. In some embodiments, each of the at least two subsets of components may be arranged in a respective matrix, and the step of calculating the post-coding matrix may comprise performing singular value decomposition on each of the respective matrices.

The transmitted signal may be an Orthogonal Frequency Division Modulation signal. In such embodiments, the delay spread threshold may correspond to a cyclic prefix length of the Orthogonal Frequency Division Modulation signal. The components of the channel impulse response estimates may, according to some embodiments, be arranged into two subsets, the first subset comprising those components that fall within a cyclic prefix of the Orthogonal Frequency Division Modulation signal and the second subset comprising the remaining components.

In some embodiments, the method may further comprise processing the at least first delay spread compensated signal to produce at least a first processed delay spread compensated signal. The step of processing the at least first delay spread compensated signal may comprise applying a Fourier transform to the at least first delay spread compensated signal. In some embodiments, the step of processing the at least first delay spread compensated signal may comprise positioning a Fourier transform window in relation to each of the plurality of delay spread compensated signals, wherein each of the Fourier transform windows are positioned based on a corresponding delay spread compensated channel impulse response; and applying a Fourier transform to each of the plurality of delay spread compensated signals based on the position of the respective Fourier transform window.

A Fourier transform may, for example, comprise a fast Fourier transform (FFT) or a discrete Fourier transform (DFT).

The transmitted signal may be a Code Division Multiple Access signal or a Wideband Code Division Multiple Access signal. In such embodiments, the method may further comprise processing the at least first delay spread compensated signal to produce at least a first processed delay spread compensated signal. The step of processing the at least first delay spread compensated signal may comprise at least one of: performing RAKE operations; performing Generalized RAKE operations; and performing chip equalizing.

A second aspect of the invention is a computer program product comprising a computer readable medium, having thereon a computer program comprising program instructions, the computer program being loadable into a data-processing unit of a communication device, the communication device having a plurality of receiver antennas and being adapted to receive a plurality of signals, each via a respective antenna, wherein each signal comprises a signal component corresponding to a transmitted signal, and wherein each received signal experiences a respective channel impulse response having a corresponding delay spread. The computer program is adapted to cause the data-processing unit, when the computer program is run by the data-processing unit, to execute at least the steps of: determining estimates of each of the channel impulse responses; calculating post-coding characteristics based on the estimates of the channel impulse responses; and post-coding the plurality of received signals using the post-coding characteristics to produce at least a first delay spread compensated signal A third aspect of the invention is a processing arrangement of delay spread compensation for a communication device having a plurality of receiver antennas. The arrangement comprises one or more receivers adapted to receive a plurality of signals, each via a respective antenna, wherein each signal comprises a signal component corresponding to a transmitted signal, and wherein each received signal experiences a respective channel impulse response having a corresponding delay spread. The arrangement also comprises one or more channel response estimators adapted to determine estimates of each of the channel impulse responses; calculation circuitry adapted to calculate post-coding characteristics based on the estimates of the channel impulse responses; and post-coding circuitry adapted to post-code the plurality of received signals using the post-coding characteristics to produce at least a first delay spread compensated signal.

A fourth aspect of the invention is a communication device comprising the arrangement according to the third aspect.

In some embodiments, the second, third and fourth aspects of the invention may additionally have features identical with or corresponding to any of the various features as explained above for the first aspect of the invention.

An advantage of some embodiments of the invention is that the negative effects of a long delay spread are reduced. One such negative effect is ISI introduced due to the long delay spread.

Another advantage of some embodiments of the invention is that receiver performance is improved.

Another advantage of some embodiments of the invention is that the length of the CP does not need to be increased in an OFDM system.

Yet another advantage of some embodiments of the invention is that the number of fingers required by a RAKE receiver is reduced in a CDMA or WCDMA system.

BRIEF DESCRIPTION OF THE DRAWINGS

Further objects, features and advantages of the invention will appear from the following detailed description of embodiments of the invention, with reference being made to the accompanying drawings, in which:

FIG. 6 is a schematic diagram illustrating exemplary channel profiles before and after application of delay spread compensation according to some embodiments of the invention;

FIG. 7 is a plot illustrating example results achieved when applying some embodiments of the invention; and FIG. 8 is a schematic drawing illustrating a mobile terminal, wherein the mobile terminal may comprise an arrangement according to some embodiments of the invention.

DETAILED DESCRIPTION

Figure 1:
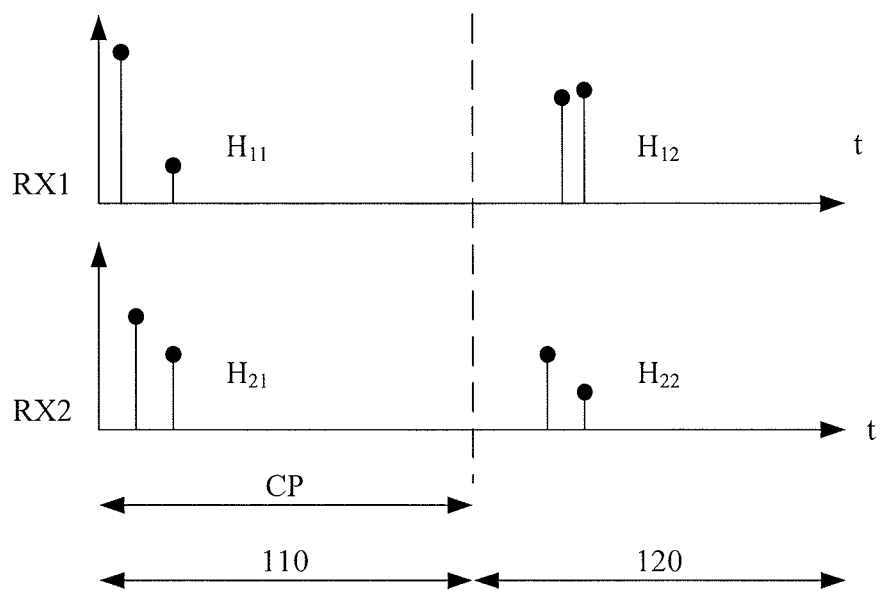
FIG. 1 is a schematic diagram illustrating exemplary channel profiles for a first and second receiver chain in an OFDM receiver.

In the following, embodiments of the invention will be described where a delay spread, seen in relation to a signal received via two or more antennas, is at least partly compensated for. Thereby, undesired parts of the channel impulse response may be suppressed. For example, the length of the delay spread may be reduced and/or the amplitude of some impulse response components may be decreased. Hence, these embodiments utilize a space domain to reduce the channel dispersion in the time domain.

When a signal is received via the two or more antennas, the signals received via the different antennas may experience different channel impulse responses. In such cases the delay spread compensation may result in that the delay spread of at least one of the channel impulse responses is reduced.

The delay spread compensation is obtained via a post-coding procedure applied to the received signal. The post-coding procedure may comprise calculating and applying a post-coding matrix. The post-coding matrix can be calculated in various ways as will be described in detail below. The calculation may be based on estimates of the channel impulse response for the respective antennas. The channel impulse response may be estimated based on either or both of pilot symbols (e.g. RS—reference signals) and synchronization symbols (e.g. PSS—primary synchronization signal and/or SSS—secondary synchronization signal). When there are more than one transmit antenna, PSS and SSS might be transmitted with other pre-coding that RS. Therefore, estimating the channel impulse response based on RS may provide an advantageous solution. The calculation of the post-coding matrix may depend on one or more optimization criteria.

The calculation of the post-coding characteristics may, for example, be based on estimated channel profile parameters (tap amplitude and phase plus relative timing of the taps). The calculation may comprise performing singular value decomposition (SVD) of a matrix comprising estimated channel profile parameters.

The taps of the estimated channel profiles may be divided into two or more subsets and the calculation may be based on the subsets. For example, a respective matrix may be formed for each subset comprising estimated channel profile parameters associated with the respective subset. Singular value decomposition (SVD) may be performed on each of the matrices thus formed. When SVD is applied, the post-coding matrix may be formed by selecting vectors corresponding to either of the smallest or the largest singular value.

The post-coding characteristics may be estimated in a feedback loop of the receiver arrangement or in a feed forward manner.

In some embodiments of the invention, calculation of post-coding parameters and application of the post-coding procedure are only performed if it is deemed beneficial. For example, it may be determined to apply the post-coding only if the delay spread of at least one of the experienced channel responses exceeds a certain length. As another example, it may be determined to apply a post-coding matrix only if the vectors of the matrix are sufficiently close to being orthogonal. Other criteria may, additionally or alternatively, be applied to determine whether or not to apply the post-coding procedure.

When the post-coding procedure has been applied to the received signal, the resulting signal may be processed further, for example using conventional receiver processing methods. Such methods may include estimating a signal-to-noise ratio (SNR) and/or detecting a transmitted signal.

According to embodiments of the invention no changes are needed at the transmitter side of a system to apply the embodiments. Thus, these embodiments illustrate algorithms that need only be applied in the receiver. The receiver may be comprised in a mobile communication device, which is suitable for operation in a radio system where two or more transmitters transmit the same signal. The two or more transmitters may be synchronized. It should be noted, however, that embodiments of the invention (e.g. a receiver) is equally applicable in systems where only one transmitter transmits the signal. In such cases, embodiments of the invention provide an advantage by handling large delay spreads (e.g. due to multipath conditions).

In the following some embodiments of the invention will be described assuming an OFDM system. However, it is to be understood that the invention is not limited to OFDM systems. Contrarily, the post-coding procedure to reduce the delay spread is applicable to all communication systems receiving a signal via two or more antennas. Further examples of systems where embodiments of the invention may be applied are CDMA or WCDMA systems as will be illustrated by some of the disclosed embodiments.

In an OFDM system, the application of the post-coding matrix may take place before application of the FFT(s) to the received signal. The FFT window placements of different receiver chains (each relating to one of the two or more receiving antennas) may have different timing in such systems. The timing may depend on the post-coding parameters and/or on the estimated channel impulse responses for the respective receiving antennas as experienced after the post-coding has been applied.

In an OFDM system, it may, for example, be determined to apply the post-coding matrix only if the delay spread of at least one of the experienced channel responses exceeds the length of the CP.

For the purpose of post-coding matrix calculation of an OFDM system, the taps of the estimated channel profiles may, for example, be divided into one subset comprising the taps that fall within the length of the CP and another subset comprising the taps that fall outside the length of the CP.

A typical optimization criterion for post-coding matrix calculation in an OFDM system may be that any channel impulse response taps outside the CP length should be suppressed.

In the following, embodiments are described where a single cell site transmitter is assumed having a single transmitter antenna as well as the receiver of the communication device having two receiver antennas. However, as is easily understood by the skilled person, these embodiments can be straightforwardly expanded to other situations, e.g. where one or more cell site transmitters (possibly transmitting the same signal in a synchronized fashion) have one or more transmitter antennas and/or the receiver of the communication device has two or more receiver antennas.

FIG. 1 illustrates example delay profiles for a first receiver antenna (RX1) and a second receiver antenna (RX2). The delay profiles may, for example, be power delay profiles or complex delay profiles. Each of the example delay profiles comprises a late part 120, $H_{12}$, $H_{22}$ (defined e.g. as components in the delay profile that have a time difference to the first component that is larger than some threshold value—e.g. a CP length as in FIG. 1) and an early part 110, $H_{11}$, $H_{21}$ (defined e.g. as a cluster of delay profile components comprising the first component or as components in the delay profile that have a time difference to the first component that is less than some threshold value).

Some embodiments of the invention work under the assumption that signal components that arrive late are received at the at least two receiver antennas from a spatial direction that is substantially different from the direction that the early signal components are received from.

Such a substantial difference in spatial direction may occur in a single cell site transmission situation, for example, when the late signal components arrive from an object well out of the line of sight between the receiver and the transmitter. A substantial difference in spatial direction may occur in a multiple cell site transmission situation where the cell sites transmit the same signal in a synchronized fashion, for example, when the late signal components arrive from another transmitter than the early signal components. Embodiments of the invention handle different variants of such scenarios (signal components arriving late and early being received from substantially different spatial directions) in a similar way, and do not need any knowledge regarding the underlying cause of the scenario at hand.

Figure 2:
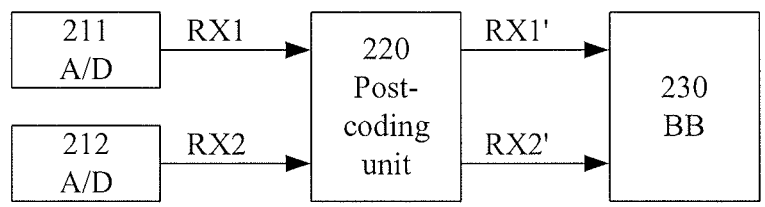
FIG. 2 is a block diagram illustrating an example arrangement according to some embodiments of the invention.

FIG. 2 illustrates a schematic block diagram of an example arrangement according to some embodiments of the invention. According to these embodiments, a post-coding unit 220 is added between the initial receiver blocks (such as a receiver front end—Fe RX—and analog-to-digital converters—A/D 211, 212) and the baseband—BB—processing block 230.

Figure 3:
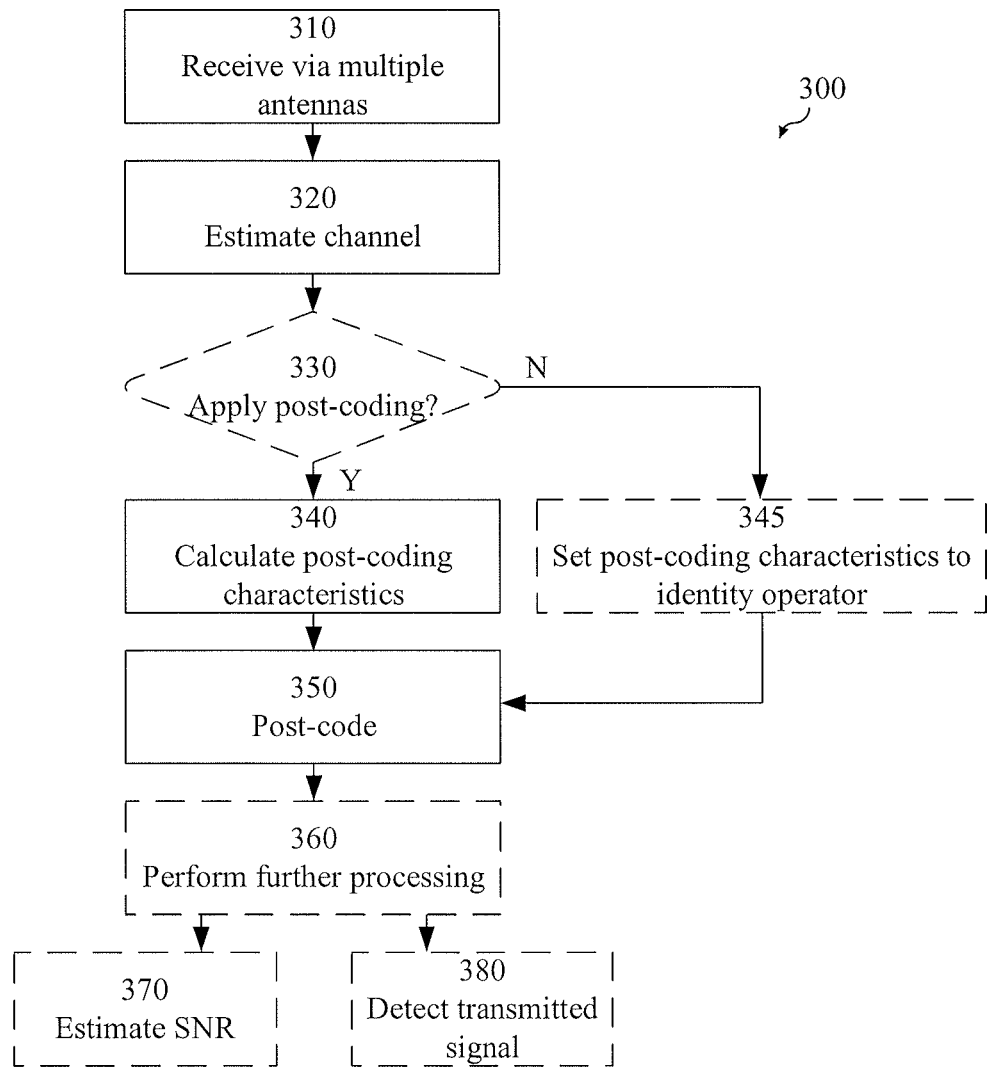
FIG. 3 is a flowchart illustrating example method steps according to some embodiments of the invention.

FIG. 3 illustrates an example method 300 according to some embodiments of the invention. Parts of the method (e.g. step 340, 345 and 350) may, for example, be implemented in post-coding unit 220 of FIG. 2.

In step 310, a transmitted signal is received via two or more receive antennas of a communication device, and estimates of the channel impulse response are determined in step 320 for each of the two or more receive antennas.

Characteristics of the post-coding (e.g. a post-coding matrix as will be explained in the following) are calculated in step 340. The calculation may, for example be based on the channel impulse response estimates determined in step 320.

In step 350, the post-coding is applied to the received signal (after initial processing, such as Fe RX and A/D) to produce a delay spread compensated signal.

The delay spread compensated signal may then be processed further in optional step 360, and the result of this further processing may be used to estimate a signal-to-noise ratio (SNR) as in step 370 and/or to detect the transmitted signal as in step 380. One or more of the steps 360, 370 and 380 may be implemented in the baseband processing block 230.

In some embodiments, the post-coding calculation is only performed under certain prerequisites. For example, if all (or some) of the delay profiles corresponding to respective receiver antennas are fairly compact (e.g. the delay spread is below some threshold) there may not be a need for the post-coding. On the other hand if some or all of the delay profiles corresponding to respective receiver antennas are spread out in time (e.g. the delay spread is above some threshold) the post-coding may be beneficial. In some embodiments, post-coding is only applied if all of the delay profiles corresponding to respective receiver antennas are spread out in time to a certain extent. In some embodiments, post-coding is applied if at least one of the delay profiles corresponding to respective receiver antennas is spread out in time to a certain extent. In some embodiments, the singular values of a matrix associated with parameters of the channel (e.g. of a comprising estimated channel profile parameters or of a calculated post-coding matrix) are studied to determine if post-coding should be applied or not. For example, post-coding may be applied if the quotient of the singular values is above a singular value quotient threshold. In OFDM, the threshold to determine when post-coding should be applied may be set at a delay spread equal to the length of the CP. In a (W)CDMA receiver where a pure chip equalizer is applied, the threshold to determine when post-coding should be applied may be set at a delay spread equal to the limit for the chip equalizer (i.e. the length of the equalizer filter). In a (W)CDMA receiver having (G)RAKE parts, a determination of when post-coding should be applied may be based on the number of delays in the power delay profile, the number of available fingers in the receiver and the cost of using these fingers. For example, a threshold may be set according to some energy saving and/or interference mitigating rule that depends on the number of available fingers in the receiver and the cost of using these fingers. Then, the number of delays in the power delay profile may be compared to this threshold and the determination may be made depending on the relation between the number of delays in the power delay profile and the threshold.

This is illustrated in FIG. 3 as optional step 330, where it is determined whether or not to apply the post-coding. If it is determined that post-coding should be applied, the process proceeds to step 340 that was described above. If it is determined that post-coding should not be applied, the process proceeds to step 345. There, the post-coding characteristics are set to values that correspond to an identity/unity operation in step 350 (e.g. a post-coding matrix would be set to the identity matrix). Then step 350 is executed as described above. In alternative embodiments, if it is determined in step 330 that post-coding should not be applied, the process proceeds directly to step 360 and steps 340 and 350 are simply bypassed.

Figure 4:
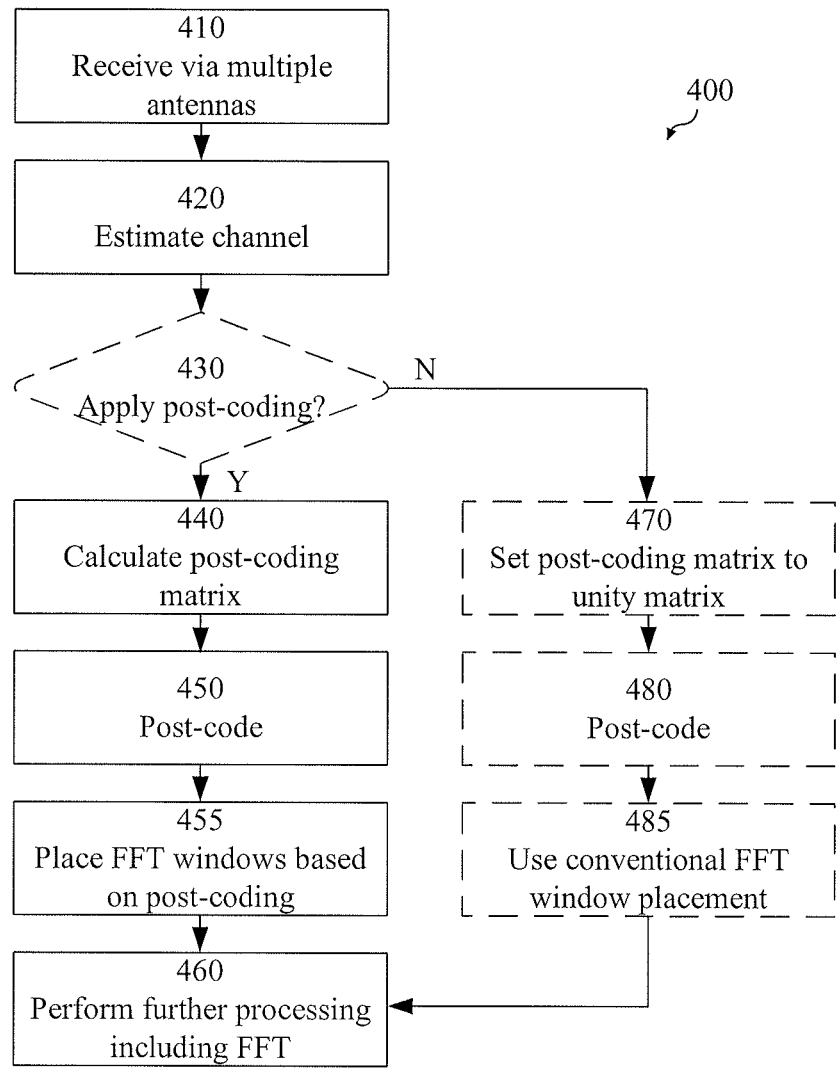
FIG. 4 is a flowchart illustrating example method steps according to some embodiments of the invention.

FIG. 4 illustrates an example method 400 according to some embodiments of the invention. In these example embodiments an OFDM system is assumed. Again, parts of the method (e.g. steps 440, 450, 470 and 480) may, for example, be implemented in post-coding unit 220 of FIG. 2.

In step 410, a transmitted signal is received via two or more receive antennas of a communication device, and estimates of the channel impulse response are determined in step 420 for each of the two or more receive antennas.

Characteristics of the post-coding (e.g. a post-coding matrix as will be explained in the following) are calculated in step 440. The calculation may, for example be based on the channel impulse response estimates determined in step 420.

In step 450, the post-coding is applied to the received signal (after initial processing, such as Fe RX and A/D) to produce a delay spread compensated signal.

The delay spread compensated signal is then processed further in steps 455 and 460. In step 455, an FFT window placement is determined for each of the receiver branches (corresponding to respective receive antennas). The FFT window placement may depend on the post-coding characteristics calculated in step 440 and/or on the delay spread compensated signal. The FFT window placement may be different or the same for the different receiver branches. For example, after the post-coding has been applied in step 450, the clusters of taps in the delay profile may differ between the different receiver branches. For instance, the first receiver branch may have a cluster corresponding to delays within the CP (similar to $H_{11}$ in FIG. 1) and a cluster corresponding to delays outside the CP (similar to $H_{12}$ in FIG. 1), wherein the energy content of the latter cluster is much smaller than that of the former. At the same time, the second receiver branch may have a cluster corresponding to delays within the CP (similar to $H_{21}$ in FIG. 1) and a cluster corresponding to delays outside the CP (similar to $H_{22}$ in FIG. 1), wherein the energy content of the former cluster is much smaller than that of the latter. In such a situation, it may be beneficial to place the FFT windows differently for the two receiver branches. For example, the FFT window of the first receiver branch may start at t=0 in FIG. 1, and the FFT window of the second receiver branch may start at a later t in FIG. 1, e.g. at a t corresponding to the dashed line. In step 460, the delay spread compensated signal may then be processed further. For example, the signal may undergo FFT computations.

In some embodiments, the post-coding calculation is only performed under certain prerequisites in a similar manner as was explained in connection to FIG. 3. This is illustrated in FIG. 4 as optional step 430, where it is determined whether or not to apply the post-coding. If it is determined that post-coding should be applied, the process proceeds to step 440 that was described above. If it is determined that post-coding should not be applied, the process proceeds to step 470. There, the post-coding characteristics are set to values that correspond to an identity/unity operation as was explained in connection to step 345 of FIG. 3. Then step 480 is executed where the identity/unity post-coding is applied to the received signal. In alternative embodiments, if it is determined in step 430 that post-coding should not be applied, the process proceeds directly to step 485 and steps 470 and 480 are simply bypassed.

In step 485, an FFT window placement is determined for each of the receiver branches (corresponding to respective receive antennas) according to conventional FFT window placement methods. Then the process proceeds to step 460, which has been described above.

One or more of the steps 455, 460 and 485 may be implemented in the baseband processing block 230.

It is to be noted that some embodiments of the invention may combine some or all of the method steps described in connection with FIGS. 3 and 4 respectively without departing from the scope of the invention. For example, step 460 may be followed by steps corresponding to steps 370 and/or 380.

The calculation of the post-coding characteristics will now be described in greater detail. The following description of that calculation may, for example, be applied in steps 340 and 440.

Different conditions may be imposed on the post-coding characteristics calculation. For example, a condition may be that taps in the channel impulse response that are later than a threshold should be maximally suppressed. A condition that can be applied in (W)CDMA embodiments (as will be described in more detail below) may be that the number of RAKE fingers required should be minimized.

The post-coding (e.g. steps 350 and 450) may, in some embodiments, be adapted to comprise a matrix multiplication of the received IQ (in-phase/quadrature) samples $Y_n$ with a post-coding matrix M:

$$\overline{Y}_n = M \cdot Y_n,$$

where $$Y_n = \begin{bmatrix} y_n^0 \\ M \\ y_n^{N_{RX}-1} \end{bmatrix}$$

is a vector of complex IQ samples for $N_{RX}$ RX branches for time index n.

The post-coding (e.g. steps 350 and 450) may, in some embodiments, be adapted to comprise a multidimensional filter F of the received IQ (in-phase/quadrature) samples $Y_n$, e.g.:

$$\overline{Y}_n = F(Y_n),$$

where $$Y_n = \begin{bmatrix} y_n^0 \\ M \\ y_n^{N_{RX}-1} \end{bmatrix}, \overline{Y}_n = \begin{bmatrix} \overline{y}_n^0 \\ M \\ \overline{y}_n^{N_{RX}-1} \end{bmatrix}$$

and (for example) $\overline{y}_n^i = f(Y_n, \overline{Y}_{n-1})$.

As mentioned above, it will, for purpose of illustration, be assumed in this description that $N_{RX}=2$. It is noted, however, that this is only for illustrative purposes and embodiments of the invention are equally applicable to cases with more than two receiver branches, $N_{RX}>2$.

After the post-coding has been applied to $Y_n$, the post-coded IQ samples $\overline{Y}_n$ may, in some embodiments, be treated in the remaining baseband circuitry/processing in the same way as if no post-coding was applied. Thus, no changes need to be made to the subsequent processing blocks (e.g. baseband processing block 230 of FIG. 2) in these embodiments.

When the post-coding involves a post-coding matrix M, this matrix can be calculated in numerous ways a few of which will be described in the following.

Assume for purpose of illustration an OFDM system and that channel impulse response estimates have been obtained for the time domain and for the two receiver chains. This may have been achieved, for example, by performing IFFT on a frequency domain channel estimates.

Embodiments of the invention divide the channel estimates into two parts in time. For example, channel estimates lying before and after a threshold in the delay profile. As explained above, the threshold may be the length of the CP. FIG. 1 illustrates an example of such a first part 110 and second part 120.

Using the same notations as in FIG. 1, this estimated channel may thus be denoted as $$H = \begin{bmatrix} H_{11} & H_{12} \\ H_{21} & H_{22} \end{bmatrix},$$

where the first row corresponds to receiver chain 1 and the second row corresponds to receiver chain 2. Further, the first column corresponds to the first part 110 and the second column 120 corresponds to the second part. $H_{ij}$ (i,j=1, 2, ...) are vectors which contain all the channel tap estimates for the respective part and receiver chain.

In some embodiments, the first part may be viewed as a desired part, i.e. a part it is desirable to keep, and the second part may be viewed as an undesirable part, i.e. a part that it would be desirable to suppress. This may, for example be the case in OFDM, where a delay profile falling within the length of the CP is entirely taken care of by the CP and need not be compensated for via post-coding.

In some embodiments the post-coder matrix calculation can be done by a singular value decomposition (SVD) operation on the second part of the channel impulse response H. This gives an ortho-normal post-coding matrix M. To this end, a matrix with two rows (corresponding to two receiver antennas) and many columns (corresponding to channel impulse response taps of the second part) is defined as $$H_2 = \begin{bmatrix} H_{12} \\ H_{22} \end{bmatrix}.$$

Using SVD, this can be decomposed into $$H_2 = USV^H.$$

In embodiments of the invention having a feed forward implementation (as will be described in connection to FIG. 5B), a raw post-coding matrix $\overline{M}$ may be selected as $$\overline{M} = U^H.$$

In embodiments of the invention having a feedback implementation (as will be described in connection to FIG. 5A), a raw post-coding matrix $\overline{M}$ may be selected as $$\overline{M} = U^H M,$$

where M is a post-coding matrix previously applied to the channel impulse response estimates.

According to some embodiments, the raw post-coding matrix is then filtered to produce the definite post-coding matrix $M^+$. For example, the following filtering formula may be applied:

$$M^+ = \text{normalize}(\alpha M + (1-\alpha)\overline{M})$$

where α is a first order filter coefficient, and the normalization operation aims to keep the post-coding matrix $M^+$ reasonably ortho-normal for stability reasons. The normalization may or may not be performed for each new post-coding matrix. The normalization may, for example, be achieved via another SVD-operation:

$$\text{normalize}(A) = UV^H, \text{ where } A = USV^H.$$

In some embodiments, the post-coder matrix may be obtained by performing the following calculations. SVD-operations are performed for both of the first (desired) and second (undesired) parts of the channel impulse response. That is to say, matrices $$H_1 = \begin{bmatrix} H_{11} \\ H_{21} \end{bmatrix} \text{ and } H_2 = \begin{bmatrix} H_{12} \\ H_{22} \end{bmatrix}$$

are defined and SVD-operations are performed on both $H_1$ and $H_2$. The two resulting U-matrices are denoted by $U_1$ and $U_2$.

In embodiments of the invention having a feed forward implementation (as will be described in connection to FIG. 5B), a raw post-coding matrix M may be selected as M=[$U_1$(:, 2), $U_2$(:, 2)]$^H$, where H denotes Hermetian transpose, the notation $U_1$(:, 1) means the first column in $U_1$ and $U_2$(:, 2) means the second column in $U_2$.

In embodiments of the invention having a feedback implementation (as will be described in connection to FIG. 5A), a raw post-coding matrix M may be selected as $$M = U^H M_{pre},$$

where $M_{pre}$ is a post-coding matrix previously applied to the channel impulse response estimates, and U=[$U_1$(:, 2), $U_2$(:, 2)]$^H$.

According to some embodiments, the raw post-coding matrix may be filtered to produce the definite post-coding matrix $M^+$ as described above. If a normalization operation is used, it comprises normalizing the sum of the squared coefficients in each row of a matrix to 1.

Figure 5A:
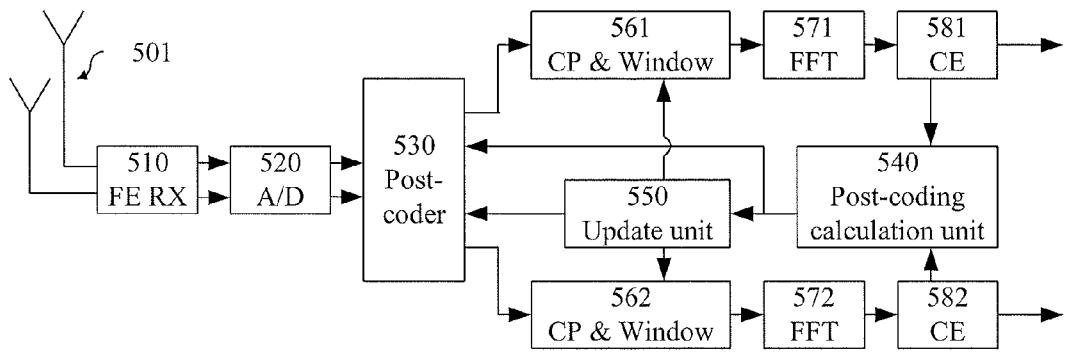
FIG. 5A is a block diagram illustrating an example arrangement according to some embodiments of the invention.
Figure 5B:
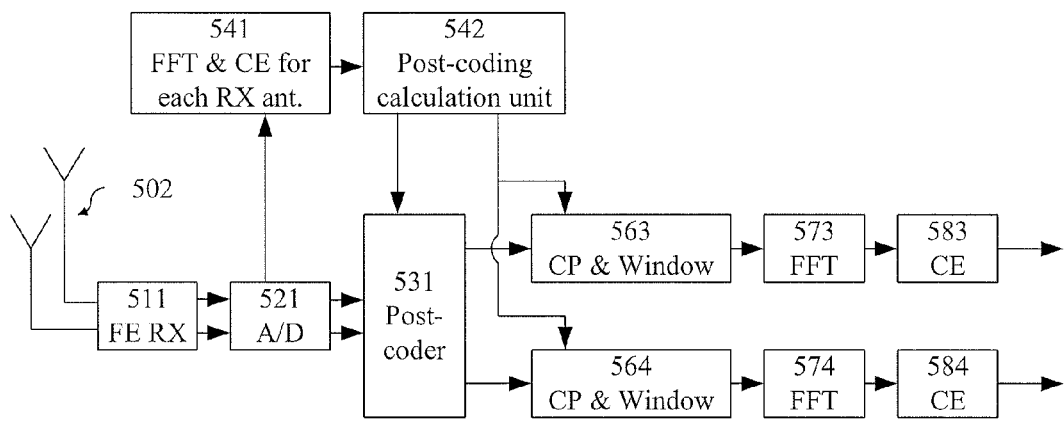
FIG. 5B is a block diagram illustrating an example arrangement according to some embodiments of the invention.

FIGS. 5A and 5B are a block diagrams illustrating an example arrangements according to some embodiments of the invention. FIG. 5A illustrates a post-coding calculation feedback implementation and FIG. 5B illustrates a post-coding calculation feed forward implementation.

In the feedback solution, the calculation of post-coding characteristics may be done based on the "standard" channel estimation, that is the result from channel estimators already present in the receiver chains. Thus, the channel estimations used for post-coding characteristics calculation may be determined based on already post-coded data. This fact may be taken into account when the post-coding characteristics are calculated. For example, a post-coding matrix may be iteratively updated as described above. For example, an identity matrix may be used as an initial value of the post-coding characteristics. A feedback implementation may require very limited additions (e.g. post-coding characteristics calculation) to already implemented solutions.

The arrangement of FIG. 5A comprises (at least) two receiver antennas 501, a receiver front end 510 and an A/D converter block 520. A post-coder 530 is adapted to apply post-coding to the output of the A/D converter block. The output of the post-coder may then undergo further processing (e.g. baseband processing) as has been described above. For example there may be provided blocks 561, 562 for removing a CP and placing an FFT-window and FFT units 571, 572 for each of the receiver branches. Channel estimators 581, 582 are provided in each of the receiver branches.

A post-coding calculation unit 540 is adapted to calculate, based on the channel estimates output from the channel estimators 581, 582, the post-coder characteristics that are to be used in the post-coder 530.

The update unit 550 determines the FFT window placements to be used in 561 and 562 based on the post-coding characteristics calculated in the post-coding calculation unit 540. The update unit 550 or a control unit (not shown) may further determine when and how to update the post-coding matrix.

In some embodiments, updating of a previous post-coding matrix to produce a raw post-coding matrix and/or filtering of the raw post-coding matrix (both as described above) are performed in the post-coder 530 or in an update unit 550 instead of in the post-coding calculation unit 540. Alternatively, these operations may be performed in the post-coding calculation unit 540 as well as the SVD-operations.

In the feed forward solution of FIG. 5B, the calculation of post-coding characteristics may be done based on the "post-coding specific" channel estimation, that is the result from channel estimators not already present in the receiver chains but added for the purpose of post-coding. Thus, the channel estimations used for post-coding characteristics calculation may be determined based on not yet post-coded data. In some embodiments, this implies a doubling of some blocks (e.g. FFT and channel estimation) in the receiver compared to already implemented solutions.

The arrangement of FIG. 5B comprises (at least) two receiver antennas 502, a receiver front end 511 and an A/D converter block 521. A post-coder 531 is adapted to apply post-coding to the output of the A/D converter block. The output of the post-coder may then undergo further processing (e.g. baseband processing) as has been described above. For example there may be provided blocks 563, 564 for removing a CP and placing an FFT-window and FFT units 573, 574 for each of the receiver branches. Channel estimators 583, 584 are provided in each of the receiver branches.

A post-coding calculation unit 542 is adapted to calculate the post-coder characteristics that are to be used in the post-coder 531. A block 541 comprises circuitry for performing operations corresponding those of the standard receiver chains (e.g. 563, 564, 573, 574, 583, 584). In particular, the block 541 is adapted to produce channel estimates based on the received signal prior to the post-coder 531. These channel estimates are input to the post-coding calculation unit 542, which bases its calculations on the channel estimates output from block 541.

In some embodiments, filtering of the raw post-coding matrix (as described above) is performed in the post-coder 531. Alternatively, this operation may be performed in the post-coding calculation unit 542 as well as the SVD-operations.

The arrangements of FIGS. 5A and 5B may be adapted to perform method steps as described in connection to FIGS. 3 and 4. For example, the following mapping of method steps to units of FIG. 5A can be envisaged. Steps 310 and 410 may be performed by the antennas 501, 502, the Fe RX 510, 511 and the A/D conversion unit 520, 521. Steps 320 and 420 may be performed in the channel estimators 581, 582 and/or in the block 541. Steps 330, 345, 430 and 470 may be performed by a control unit (not shown). Steps 340 and 440 may be performed by the post-coding calculation unit 540, 542. Steps 350, 450 and 480 may be performed by the post-coder 530, 531. Step 360 may be performed by the blocks 561, 562, 563, 564, 571, 572, 573, 574, 581, 582, 583 and 584. Steps 455 and 485 may be performed by blocks 561, 562, 563 and 564 (possibly with the aid of block 550). Step 460 may be performed by the blocks 571, 572, 573, 574, 581, 582, 583 and 584.

In some embodiments of the invention the post-coding results in that the first and second clusters of taps (see FIG. 1) are separated. In some embodiments the clusters are separated to a maximum degree. In some embodiments that means that on one receiver branch the first channel tap cluster is dominating, while on the second branch the second cluster is dominating (or vice versa). This is one of the reasons why the FFT window placement may differ from one receiver branch to another as mentioned above.

FIG. 6 is a schematic diagram illustrating exemplary channel profiles before and after application of delay spread compensation according to some embodiments of the invention. In this example, the channel is a four-tap channel, with two taps that falls outside the CP. It is assumed that the system has one transmitter antenna and two receiver antennas. The post-coding is done according to the embodiment where SVD-operations are performed for both of the first (desired) and second (undesired) parts of the channel impulse response. It can be seen in the lower right graph that the ISI can be suppressed to a large extent.

FIG. 7 is a plot, illustrating example results achieved when applying some embodiments of the invention in performance simulations.

A 3GPP LTE system was simulated in a setting where the resulting channel has a power delay profile of two equally strong taps: One at 0 µs delay and one at 8 µs delay. Furthermore a Doppler spread of 5 Hz is assumed. The standardized normal CP of 3GPP LTE is used, which means that all propagation echoes in excess of 4.7 µs will create inter-symbol interference.

A feedback embodiment is used with the pre-coding matrix calculation where SVD-operations are performed on a matrix with rows corresponding to the receiver antennas and columns corresponding to channel impulse response taps of the second part of the impulse response.

No genie information was used and the receiver parameters were realistic. It can be seen that, in this setting, embodiments of the invention manage to suppress the second channel tap enough to enable approximately twice the throughput, compared to a conventional receiver without a post-coder. The maximum throughput for an AWGN channel with otherwise the same settings is 31 Mbits/s.

Thus, embodiments of the invention may be used to reduce the effects (e.g. ISI) of long delay spreads. Hence, embodiments of the invention may improve the performance of a receiver. Embodiments of the invention may, for example, become useful in any OFDM-systems, in LTE advanced systems (e.g. when using CoMP, i.e. when the mobile communication device receives from several base stations that transmits the same signal).

Embodiments of the invention may be applicable to, for example, WCDMA systems as well as to OFDM systems. In a WCDMA system, embodiments of the invention may be used to reduce the number of required RAKE fingers.

A RAKE receiver for a WCDMA system aims at exploiting transmitted signals arriving at the receiver at a number of different delays, each delay corresponding to a different signal propagating path from the transmitter to the receiver.

For each such delay exploited in the RAKE receiver, a despreader/correlator (a so-called RAKE finger) is required. Thus, the more delays that should be exploited, the more despreaders/correlators (as well as combiner inputs and combining weight computation resources) will be required.

Generally speaking, the SINR (Signal-to-Interference-and-Noise Ratio) at a symbol in the RAKE receiver becomes higher if more fingers are used. On the other hand, more fingers require more hardware and more power. If there are unexploited signal delays, the SINR would suffer both from loss of possible signal energy and, to some extent, from unnecessary interference.

Therefore, it is desirable to reduce the number of delays in the delay profile before applying the RAKE receiver to the received signal (possibly without losing too much of SINR at a symbol detector).

Furthermore, in a G-RAKE (Generalized RAKE) receiver for a WCDMA system, fingers are often placed not only at delays corresponding to propagation paths, but also at other delays that have some correlation to the propagation path delays. This generally improves the SINR at a signal detector after the G-RAKE. In such implementations, the need for hardware and power increases even more when the number of path delays increases, compared to in the RAKE implementation.

Further, a pure chip equalizer (without any following RAKE or G-RAKE) for a WCDMA system aims at inverting the radio channel from the transmitter to the receiver using an adaptive filter. If the delay spread of the radio channel is too long, the chip equalizer may not have enough delay possibilities in its filter to perform well, and its inversion performance will suffer. The result may be unnecessary interference.

It would therefore be beneficial in the case of a pure chip equalizer if a large delay spread radio channel could be mitigated before application of the chip equalizer.

Even further, a chip equalizer followed by a RAKE or G-RAKE would benefit from the number of fingers being kept small and the delay spread being kept low.

For (W)CDMA receivers there is thus a need for exploiting multi-path signals using a low number of fingers and/or using receiver parts that have limited delay spread performance without losing too much of signal energy or introducing unnecessary interference.

WO 2007/147506 A1 discloses one solution for coping with a path dense dual antenna scenario, using a limited number of fingers.

Applying embodiments of the invention to (W)CDMA systems may have the effect that, after post-coding, the received signals have a more compact channel impulse response with fewer significant delays. See for example FIG. 6 (lower right). Such a signal is easier to process for a (W)CDMA receiver than, for example, the signal shown in FIG. 6 (lower left) as has been elaborated on above.

Since the path delays at 6 and 7 µs in FIG. 6 (lower right) are successfully attenuated, a simplified (W)CDMA receiver may be used that neglects these delays (and possibly exploits only the second receiver branch—at least if the radio scenario is not limited by background noise rather than by interference). Although some signal energy may be lost, such an approach also saves a lot of hardware and power and may still achieve a good SINR at a symbol detector.

Embodiments of the invention applicable to (W)CDMA systems may be designed similarly to what has been described in connection to FIGS. 5A and 5B. In that case, the blocks 561, 562, 563, 564, 571, 572, 573, 574, 581, 582, 583 and 584 could be replaced by blocks comprising one or more RAKE/G-RAKE receivers and/or one or more chip equalizers. As indicated above, only one of the post-coder outputs may be exploited. In some embodiments, more than one (or all) of the post-coder outputs may be exploited.

FIG. 8 illustrates an example mobile terminal 800. The mobile terminal may comprise one or more arrangements according to embodiments of the invention. The mobile terminal may, for example, comprise one or more arrangements as described in connection to FIGS. 5A and 5B.

The mobile terminal 800 is illustrated as a mobile telephone in a schematic front view. This example mobile terminal comprises at least two antennas mounted within the housing of the apparatus. Alternatively, one or more of the at least two antennas may be mounted on the housing of the apparatus. The mobile terminal may further comprise a display 810, a keypad 820, a loudspeaker, and a microphone, which together provides a man-machine interface for operating the mobile terminal.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or hand-held mobile radio communication equipment, a mobile radio terminal, a mobile telephone, a communicator, an electronic organizer, a smartphone, a computer, a notebook, an embedded drive, a mobile gaming device, a mobile or stationary television set or radio, or a (wrist) watch.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute at least some of the method steps according to, for example, the methods shown in any of FIGS. 3 and 4.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of delay spread compensation for improving throughput, suitable for use in a communication device having a plurality of receiver antennas, comprising:
receiving a plurality of signals, each via a respective antenna, wherein each signal comprises a signal component corresponding to a transmitted signal, and wherein each received signal experiences a respective channel impulse response having a corresponding delay spread;
determining estimates of each of the channel impulse responses;
calculating post-coding characteristics based on the estimates of the channel impulse responses; and
post-coding the plurality of received signals using the post-coding characteristics to produce at least a first delay spread compensated signal;
wherein
the post-coding characteristics comprise a post-coding matrix M; and
post-coding the plurality of received signals using the post-coding characteristics comprises multiplying a vector $Y_n$ f complex IQ samples of the plurality of received signal for a time index n with the post coding matrix M to generate a vector $\overline{Y}_n$ of post-coded IQ samples;
and wherein the method further comprises:
determining whether at least one of the delay spreads corresponding to respective channel impulse responses is larger than a delay spread threshold; and
only if it is determined that at least one of the delay spreads is larger than the delay spread threshold, performing the steps of:
calculating post-coding characteristics based on the estimates of the channel impulse responses; and
post-coding the plurality of received signals using the post-coding characteristics to produce at least a first delay spread compensated signal.

2. The method of claim 1, wherein the at least first delay spread compensated signal comprises a plurality of delay spread compensated signals, the plurality of delay spread compensated signals being a same plurality as the plurality of received signals.

3. The method of claim 2, further comprising processing the at least first delay spread compensated signal to produce at least a first processed delay spread compensated signal, wherein the step of processing the at least first delay spread compensated signal comprises:
positioning a Fourier transform window in relation to each of the plurality of delay spread compensated signals, wherein each of the Fourier transform windows are positioned based on a corresponding delay spread compensated channel impulse response; and
applying a Fourier transform to each of the plurality of delay spread compensated signals based on the position of the respective Fourier transform window.

4. The method of claim 1, wherein the post-coding matrix is calculated based on value and timing of components of the channel impulse response estimates.

5. The method of claim 4, wherein the step of calculating the post-coding matrix comprises performing singular value decomposition on a matrix comprising the components of the channel impulse response estimates.

6. The method of claim 4, wherein the components of the channel impulse response estimates are arranged into at least two subsets of components and the post-coding matrix is calculated based on the subsets.

7. The method of claim 6, wherein each of the at least two subsets of components are arranged in a respective matrix, and wherein the step of calculating the post-coding matrix comprises performing singular value decomposition on each of the respective matrices.

8. The method of claim 6, wherein the components of the channel impulse response estimates are arranged into two subsets, the first subset comprising those components that fall within a cyclic prefix of the Orthogonal Frequency Division Modulation signal and the second subset comprising the remaining components.

9. The method of claim 1, wherein the transmitted signal is an Orthogonal Frequency Division Modulation signal.

10. The method of claim 9, further comprising processing the at least first delay spread compensated signal to produce at least a first processed delay spread compensated signal, wherein the step of processing the at least first delay spread compensated signal comprises applying a Fourier transform to the at least first delay spread compensated signal.

11. The method of claim 1, wherein the delay spread threshold corresponds to a cyclic prefix length of the Orthogonal Frequency Division Modulation signal.

12. The method of claim 1, wherein the transmitted signal is a Code Division Multiple Access signal or a Wideband Code Division Multiple Access signal.

13. The method of claim 12, further comprising processing the at least first delay spread compensated signal to produce at least a first processed delay spread compensated signal, wherein the step of processing the at least first delay spread compensated signal comprises at least one of:
performing RAKE operations;
performing Generalized RAKE operations; and
performing chip equalizing.

14. A non-transitory computer readable medium, having thereon a computer program comprising program instructions, the computer program being loadable into a data-processing unit of a communication device,
the communication device having a plurality of receiver antennas and being adapted to receive a plurality of signals, each via a respective antenna, wherein each signal comprises a signal component corresponding to a transmitted signal, and wherein each received signal experiences a respective channel impulse response having a corresponding delay spread,
the computer program being adapted to cause the data-processing unit, when the computer program is run by the data-processing unit, to execute at least the steps of:
determining estimates of each of the channel impulse responses;
calculating post-coding characteristics based on the estimates of the channel impulse responses; and
post-coding the plurality of received signals using the post-coding characteristics to produce at least a first delay spread compensated signal;

wherein:
the post-coding characteristics comprises a post-coding matrix M; and
post-coding the plurality of received signals using the post-coding characteristics comprises multiplying a vector $Y_n$ of complex IQ samples of the plurality of received signals for a time index n with the post coding matrix M to generate a vector $\overline{Y}_n$ of post-coded IQ samples;
and wherein the computer program is adapted to cause the data-processing unit, when the computer program is run by the data-processing unit, to execute at least the further steps of:
determining whether at least one of the delay spreads corresponding to respective channel impulse responses is larger than a delay spread threshold; and
only if it is determined that at least one of the delay spreads is larger than the delay spread threshold, performing the steps of:
calculating post-coding characteristics based on the estimates of the channel impulse responses; and
post-coding the plurality of received signals using the post-coding characteristics to produce at least a first delay spread compensated signal.

15. A processing arrangement of delay spread compensation for improving throughput for a communication device having a plurality of receiver antennas, comprising:
one or more receivers adapted to receive a plurality of signals, each via a respective antenna, wherein each signal comprises a signal component corresponding to a transmitted signal, and wherein each received signal experiences a respective channel impulse response having a corresponding delay spread;
one or more channel response estimators adapted to determine estimates of each of the channel impulse responses;
calculation circuitry adapted to calculate post-coding characteristics based on the estimates of the channel impulse responses; and
post-coding circuitry adapted to post-code the plurality of received signals using the post-coding characteristics to produce at least a first delay spread compensated signal;
wherein
the post-coding characteristics comprise a post-coding matrix M; and
the post-coding circuitry is adapted to post-code the plurality of received signals using the post-coding characteristics by multiplying a vector $Y_n$ of complex IQ samples of the plurality of received signals for a time index n with the post coding matrix M to generate a vector $\overline{Y}_n$ of post-coded IQ samples;
and wherein the arrangement further comprises:
determining circuitry adapted to determine whether at least one of the delay spreads corresponding to respective channel impulse responses is larger than a delay spread threshold, and wherein the calculation circuitry and the post-coding circuitry are only operational if it is determined that at least one of the delay spreads is larger than the delay spread threshold.

16. The arrangement of claim 15, wherein the at least first delay spread compensated signal comprises a plurality of delay spread compensated signals, the plurality of delay spread compensated signals being a same plurality as the plurality of received signals.

17. The arrangement of claim 16, further comprising processing circuitry adapted to process the at least first delay spread compensated signal to produce at least a first processed delay spread compensated signal, wherein the processing circuitry comprises:
window placement circuitry adapted to position a respective Fourier transform window in relation to each of the plurality of delay spread compensated signals, wherein each of the respective Fourier transform windows are positioned based on a corresponding delay spread compensated channel impulse response; and
at least one Fourier transform unit adapted to apply a Fourier transform to each of the plurality of delay spread compensated signals based on the position of the respective Fourier transform window.

18. The arrangement of claim 15, wherein the transmitted signal is an Orthogonal Frequency Division Modulation signal.

19. The arrangement of claim 18, further comprising processing circuitry adapted to process the at least first delay spread compensated signal to produce at least a first processed delay spread compensated signal, wherein the processing circuitry comprises at least one Fourier transform unit.

20. The arrangement of claim 15, wherein the transmitted signal is a Code Division Multiple Access signal or a Wideband Code Division Multiple Access signal.

21. The arrangement of claim 20, further comprising processing circuitry adapted to process the at least first delay spread compensated signal to produce at least a first processed delay spread compensated signal, wherein the processing circuitry comprises at least one of:
RAKE processing circuitry;
Generalized RAKE processing circuitry; and
a chip equalizer.

22. The arrangement of claim 15, wherein the arrangement is at least a part of a communication device.

* * * * *